United States Patent
Eising et al.

(10) Patent No.: US 11,191,206 B2
(45) Date of Patent: Dec. 7, 2021

(54) DEPTH DETECTION OF A SOIL COULTER

(71) Applicant: 7108789 Manitoba Inc., Winnipeg (CA)

(72) Inventors: Erik Eising, Winnipeg (CA); Casey Forsyth, Winnipeg (CA)

(73) Assignee: 7108789 Manitoba Inc., Winnipeg (CA)

( * ) Notice: Subject to any disclaimer, the term of this patent is extended or adjusted under 35 U.S.C. 154(b) by 265 days.

(21) Appl. No.: 16/534,072

(22) Filed: Aug. 7, 2019

(65) Prior Publication Data

US 2020/0045875 A1 Feb. 13, 2020

Related U.S. Application Data

(60) Provisional application No. 62/715,873, filed on Aug. 8, 2018, provisional application No. 62/743,613, filed on Oct. 10, 2018.

(51) Int. Cl.
| | |
|---|---|
| *A01C 5/06* | (2006.01) |
| *A01C 7/20* | (2006.01) |
| *A01C 7/08* | (2006.01) |
| *A01B 47/00* | (2006.01) |

(Continued)

(52) U.S. Cl.
CPC .............. *A01C 5/064* (2013.01); *A01C 7/08* (2013.01); *A01C 7/203* (2013.01); *G01B 11/22* (2013.01); *A01B 47/00* (2013.01); *A01D 33/00* (2013.01)

(58) Field of Classification Search
CPC ........... A01C 5/064; A01C 7/08; A01C 7/203; A01B 47/00
See application file for complete search history.

(56) References Cited

U.S. PATENT DOCUMENTS

| | | |
|---|---|---|
| 7,547,904 B2 | 6/2009 | Schmidt |
| 8,451,449 B2 | 5/2013 | Holland |
| 9,192,091 B2 | 11/2015 | Bassett |

(Continued)

OTHER PUBLICATIONS

"Book of Farm" to Henry Stephens (1854), pp. 271-273 and Bacon, Charles Allen (1920), "The Oliver plow Book; a treatise on plows and plowing" p. 163; recovered from referenced [1] and [2[ respectively of https://en.wikipedia.org/wiki/Coulter_(agriculture)#cite_note-BookOfTheFarm-1.

(Continued)

*Primary Examiner* — Thomas B Will
*Assistant Examiner* — Ian A Normile
(74) *Attorney, Agent, or Firm* — Adrian D. Battison; Ade & Company Inc; Ryan W. Dupuis

(57) ABSTRACT

Depth of penetration of a soil coulter is detected using a sensor being mounted on the side of the disk adjacent the edge such that the sensor as the disk rotates is located above the surface of the soil during a first part of its rotation and is located below the surface during a second part of its rotation. The sensor issues a signal which changes in response to whether the sensor is above or below the soil surface which is received by a controller which calculates from the signal a first time when the sensor enters below the soil surface and a second time when the sensor departs the soil surface and calculates from the first and second times the depth of penetration of the coulter in the soil. The system can also detect variations in depth indicative of a value of surface roughness.

14 Claims, 2 Drawing Sheets

(51) Int. Cl.
    *G01B 11/22*        (2006.01)
    *A01D 33/00*        (2006.01)

(56) References Cited

U.S. PATENT DOCUMENTS

| | | |
|---|---|---|
| 9,891,155 B2 * | 2/2018 | Eising ................... G01J 3/4412 |
| 10,444,176 B2 * | 10/2019 | Puhalla ................ G01N 27/223 |
| 2002/0039186 A1 | 4/2002 | Rosenberg |
| 2002/0131046 A1 | 9/2002 | Christy |
| 2012/0324986 A1 | 12/2012 | Chekalyuk |
| 2018/0120082 A1 | 5/2018 | Rhodes |
| 2019/0059198 A1 * | 2/2019 | Schnaider ............ G01N 29/041 |

OTHER PUBLICATIONS http://summersmfg.com/media/1182/coulterchisel-blades.png?width=435&height=290 or http://thurstonmfg.co/wp-content/uploads/2014/Picture1.png.
http://www.gatesmfg.net/products/coulter-disc/ (Photo Gallery section).

\* cited by examiner

DEPTH DETECTION OF A SOIL COULTER

This application claims the benefit under 35 USC 119(e) of Provisional Application 62/715,873 filed Aug. 8, 2018 and Provisional Application 62/743,613 filed Oct. 10, 2018.

This invention relates to a soil coulter of the type comprising a disk, the edge of which cuts into the soil to a depth determined by the pressure on the coulter and the characteristics of the soil over which the coulter is running.

The arrangement herein can be used for measurement of depth during seeding where the seed is placed in a furrow opened by the coulter, or during soil analysis using the arrangement shown in U.S. Pat. No. 9,891,155 issued Feb. 13, 2018 by the inventor herein which uses a soil coulter to carry a soil sensor for analyzing soil quality and constituents.

While the arrangement herein is described in relation to soil, it is not necessary in this invention that the soil be part of the ground, since the invention may be applied to other materials or growing media which are not part of the ground but may be part of a bed. In this case the bed may be moved relative to the coulter rather than the conventional arrangement where the coulter rolls over the ground.

SUMMARY OF THE INVENTION

According to a first aspect of the invention there is provided a soil coulter for soil penetration comprising:

a disk having a peripheral edge and two spaced side walls extending from the peripheral edge toward a center of the disk;

a hub mounting the disk for rotation about an axis of the disk so that the peripheral edge rotates in the soil and the coulter penetrates the soil to a depth below a surface of the soil;

a sensor mounted in one side wall of the disk;

the sensor being mounted on the disk for rotation therewith;

the sensor being mounted on the disk at a position thereon such that the sensor as the disk rotates is located above the surface of the soil during a first part of its rotation and is located below the surface during a second part of its rotation;

the sensor being adapted to issue a signal which changes in response to whether the sensor is above or below the soil surface;

and a controller responsive to the signal and adapted to calculate from the signal a first time when the sensor enters below the soil surface and a second time when the sensor departs the soil surface and to calculate from the first and second times the depth of penetration of the coulter in the soil.

Preferably the sensor detects a reflected light beam from a source adjacent the sensor. However other types of signals can be used for example ultrasonic signals. The sensor comprises a receptor of the light or other signal and a detector which generates an electrical output and it will be appreciated that the receptor may be located at the position on the disk to receive the signal whereas the detector itself may be located at the same receptor location or may be located remotely with the signal being communicated though a fiber or other transmission to the remote detector to generate the required output electrical signal for analysis.

In one embodiment, the sensor is part of an analysis system for example of the type described in the above patent arranged to provide data relating to the characteristics of the soil when the sensor is below the soil surface. In this embodiment the controller calculates the maximum depth of penetration of the coulter at the sensor so as to determine by the sensor characteristics of the soil at calculated depths.

In this arrangement preferably the sensor feeds the data to an analysis system to obtain an analysis of the characteristics of the soil from the surface to the maximum depth. These characteristics are then correlated with the actual detected depth as the depth of the sensor varies as the sensor rotates with the coulter.

The system may include an operator for changing a downward pressure on the disk so as to change a maximum depth of penetration of the sensor.

In another embodiment, the controller calculates the depth of penetration of the coulter at the peripheral edge so as to calculate a depth of a furrow formed by the peripheral edge. This can be used in a component for supplying seeds or other materials into a furrow formed by the peripheral edge of the disk where the depth of actual penetration is accurately calculated to better control depth of placement of the materials. In this arrangement in a seeder, an assembly for changing a downward pressure on the disk acts so as to change the depth of the furrow and hence the depth of the supply of seeds or the seeding action.

To provide more accurate information on the depth measurement, preferably the controller includes filter steps arranged to average depths over a period of time so that clumps in the soil surface are averaged out or compensated.

Also the system can be used to detect the roughness of the surface by averaging data to detect a surface level and by detecting differences from the average indicative of changes in that surface and hence surface roughness. In tillage and seeding/planting operations, the roughness/smoothness of the soil surface to be achieved is an important aspect of proper settings for tillage and seeding/planting equipment. That is in practical examples;

—a— the system acts to provide to a tractor operator instructions to till a field at a certain depth and a certain speed with the result that the operator goes too fast on the light soil part of the field so that the tillage operation pulverizes the soil, and too slow on the heavy soil part of the field so that the tillage operation leaves the soil too lumpy.

—b— the system acts to provide smoothness/roughness indication of soil surface which provides a better method for setting tractor speed and depth of implement, matching speed and tillage/planting/seeding under varying field conditions.

In accordance with another important feature, the controller is arranged to generate a value indicative of speed or rate of rotation and to calculate therefrom an instantaneous depth of the detector as the detector rotates with the coulter below the soil surface in addition to the maximum depth of the detector.

In order to provide accurate real time information, preferably the controller collects data from the detector at a frequency between 5 and 100 times per second.

Preferably the signal is compared to a threshold to determine if the detector is in or out of the soil.

Preferably, if the detector is in the ground the data from the controller is sent for further analysis using a plurality of samples to determine speed, in ground time, and therefore detector depth. However, the present arrangement can be used for controlling depth only without any requirement for soil analysis.

Preferably the controller is arranged such that every 10-30 seconds the In/Out data is analysed. For example, the controller is arranged to determine the period of the signal, and the In/Out ratio.

Preferably the controller is arranged to filter all of the data points and if data is irregular or non-uniform it is discarded.

Preferably the controller is arranged such that the wheel speed is calculated using the period of the signals from the wheel.

Preferably the controller is arranged such that there is a transformation of the power spectral density including summed average, array multiplication, etc.

Preferably the sensor is arranged to provide data relating to the characteristics of the soil when the sensor is below the soil surface and the controller calculates the depth of penetration of the coulter at the sensor so as to determine by the sensor characteristics of the soil at calculated depths. In this way, the sensor feeds the data to an analysis system to obtain an analysis of the characteristics of the soil from the surface to the maximum depth as the depth of the sensor varies as the sensor rotates with the coulter.

In a preferred arrangement, the detector detects a reflected beam and the detector includes a component mounted within the coulter disk and a transparent window at the side wall so as to receive electromagnetic radiation passing through the transparent window in the side wall of the coulter disk.

In one embodiment the operation comprises seeding and the operating device is arranged to deposit seeds in the furrow In one embodiment the operation comprises harvesting of underground crops such as root crops.

In one embodiment the operation comprises a ground operation such as tillage equipment or excavation equipment.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
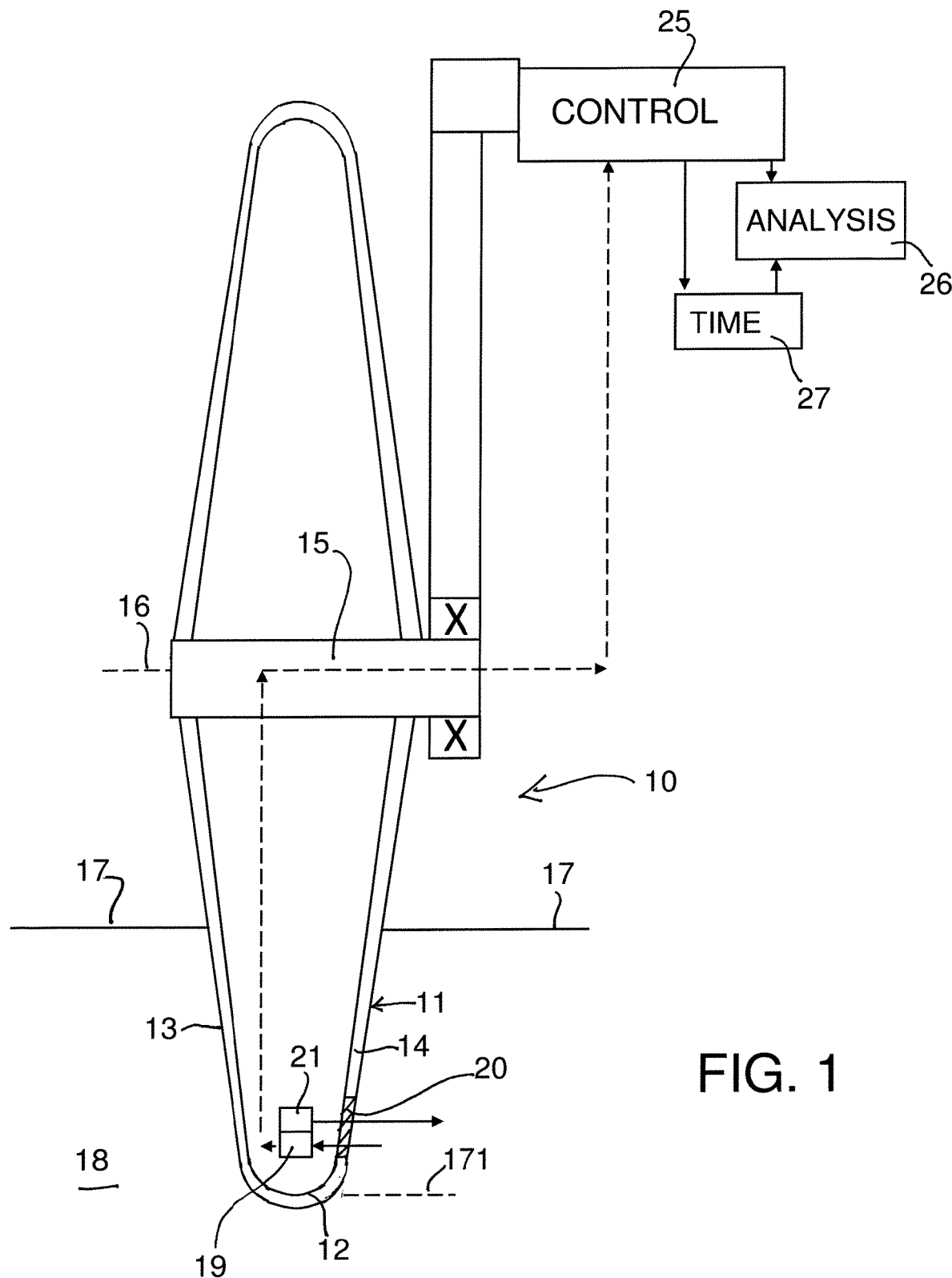
FIG. 1 is a vertical cross-sectional view of a coulter for measuring depth according to the present invention.

The soil coulter 10 for soil penetration includes a coulter disk 11 having a peripheral edge 12 and two spaced side walls 13, 14 extending from the peripheral edge toward a center of the disk. At the center is mounted a hub 15 mounting the disk for rotation about an axis 16 of the disk so that the peripheral edge 12 rotates in the soil and the coulter penetrates the soil to a depth below a surface 17 of the soil 18.

The arrangement herein uses basically the construction and arrangement as shown and described in the above prior patent, the disclosure of which is incorporated by reference.

The apparatus thus includes a sensor 19 mounted in a window 20 in one side wall 14 of the disk so that the sensor is mounted on the disk for rotation therewith.

The sensor can comprise a detector responsive to a reflected light beam from a source 21 or it can comprise a receptor such as an optical fiber which receives the light and transmits it to a remote detector.

The sensor is mounted on the disk at a position thereon adjacent the edge such that the sensor as the disk rotates is located above the surface of the soil during a first part of its rotation and is located below the surface during a second part of its rotation. The placement of the window as close as structurally possible to the edge or rim 12 is desirable to obtain maximum time of the detector within the soil The sensor is adapted to issue a signal which changes in response to whether the sensor is above or below the soil surface. That is the reflected beam is significantly different in character depending on whether it is reflected from the soil or whether there is no external material to reflect when the window is above the surface.

A controller 25 is provided which is responsive to the signal and is adapted to calculate from the changes in the signal due to its position relative to the surface using a program 27 a first time stamp when the sensor enters below the soil surface and a second time stamp when the sensor departs the soil surface. Regardless of the rate of rotation of the disk, the proportion of time below the surface relative to the proportion above the surface allows the calculation by simple geometry from the first and second time stamps the depth of penetration of the coulter in the soil.

Figure 2:
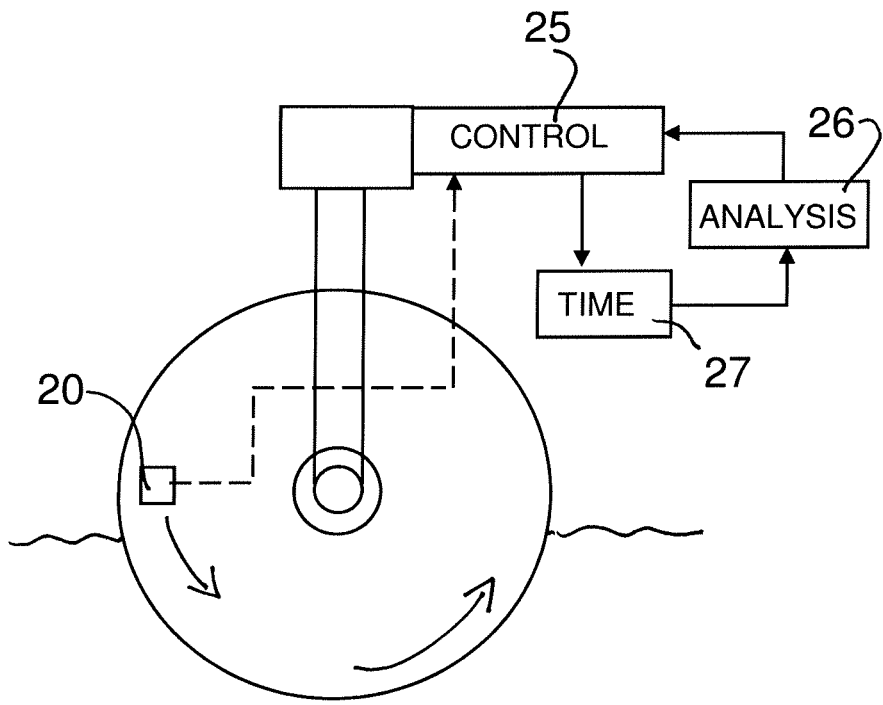
FIG. 2 is a side elevational view of the coulter of FIG. 1 for use in soil analysis.

In FIGS. 1 and 2, the sensor feeds the data to an analysis system 26 to obtain an analysis of the characteristics of the soil from the surface to the maximum depth as the depth of the sensor varies as the sensor rotates with the coulter. The depth relative to a time between the two time stamps can be calculated and correlated to the characteristics as measured thus providing soil characteristics data at different depths between the surface and the maximum depth 171.

Figure 3:
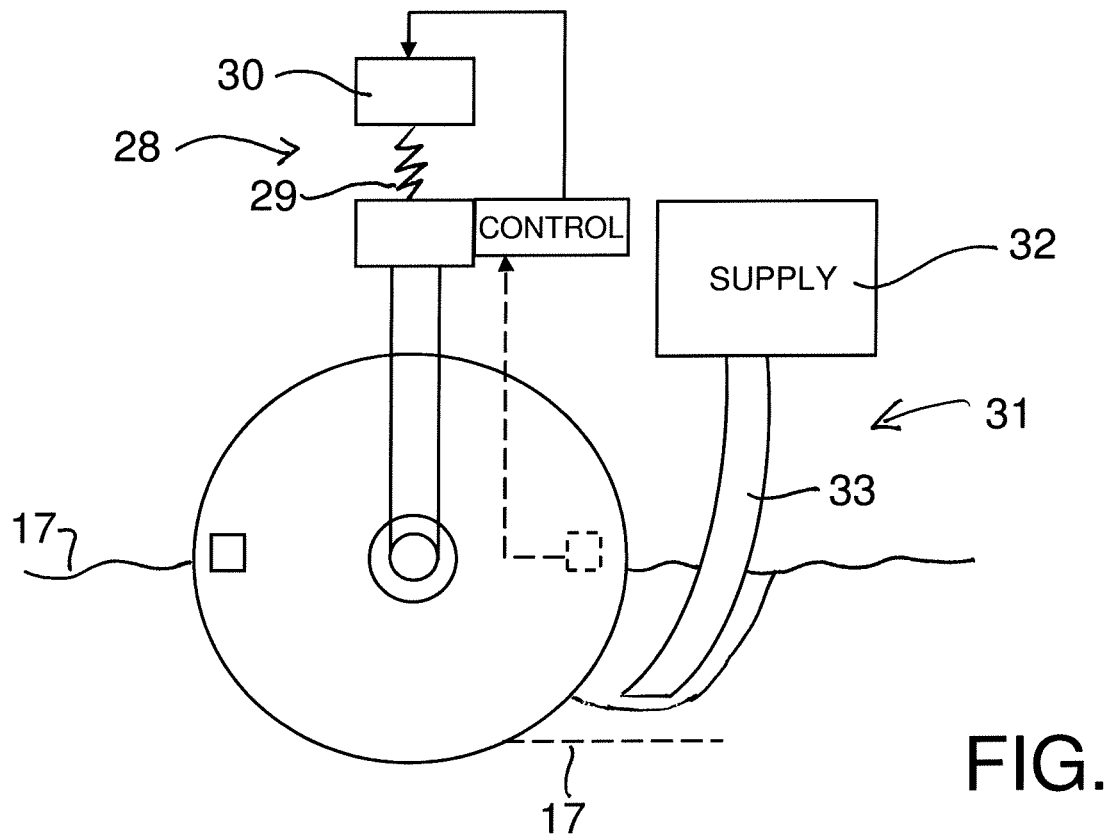
FIG. 3 is a side elevational view of the coulter of FIG. 1 for use in seeding.

The system also includes an assembly 28 shown in FIG. 3 for changing a downward pressure on the disk applied by a spring 29 moved by an actuator 30 so as to change a maximum depth of penetration of the sensor.

As explained above, the controller can calculate the maximum depth of penetration 171 of the coulter at the peripheral edge 12 so as to calculate a depth of a furrow formed by the peripheral edge. This can be used with a seeding component 31 including a seed supply 32 and a supply tube 33 for supplying seeds into the furrow formed by the peripheral edge of the disk. In this case the depth control pressure system 28 acts for changing a downward pressure on the disk so as change the depth of the furrow and hence the depth of the seeding action.

In FIGS. 1 to 3, therefore there is disclosed a soil coulter 10 for soil penetration comprising a disk having a peripheral edge 11 and two spaced side walls 12, 13 extending from the peripheral edge 11 toward a center of the disk at which a hub 15 mounts the disk for rotation about an axis 16 of the disk so that the peripheral edge 12 rotates in the soil and the coulter penetrates the soil to a depth below a surface of the soil 17. An operating component 31 is provided which in this embodiment comprises a seeding member 33 for operating in a furrow formed by the peripheral edge of the disk. A detector 21 responsive to electromagnetic radiation from material adjacent the coulter disk for emitting a signal related thereto is mounted at one side wall of the disk for rotation therewith. The detector is mounted on the disk at a position thereon adjacent the edge such that the sensor as the disk rotates is located above the surface of the soil during a first part of its rotation and is located below the surface during a second part of its rotation. The control system 25 is responsive to the signal to calculate the depth of penetration of the coulter in the soil and an assembly 28 is provided for changing a downward pressure on the disk 10 so as to change a depth of penetration of the coulter disk and hence a depth of the operation. The sensor is also arranged to provide data relating to the characteristics of the soil when the sensor is below the soil surface and the controller calculates the maximum depth of penetration of the coulter at the sensor so as to determine by the sensor characteristics of the soil at calculated depths. The sensor feeds the data to an analysis system 26 to obtain an analysis of the characteristics of the soil from the surface to the maximum depth as the depth of the sensor varies as the sensor rotates with the coulter. In this embodiment the sensor detects a reflected beam from a source inside the disk.

In one mode of calculation, the controller 25 is adapted to calculate from the signal a first time when the sensor enters below the soil surface and a second time when the sensor departs the soil surface and to calculate from the first and second times the depth of penetration of the coulter in the soil.

In the operation shown in FIGS. 1 to 3, the operation which is effected at a required depth as measured by the system comprises seeding and the operating device is arranged to deposit seeds in the furrow from the duct 33.

However in arrangements not shown the operation can be related to other operations such as harvesting of underground crops such as root crops or other ground operation such as tillage equipment or excavation equipment.

Furrows and clumps in the solid can be "averaged out" or compensated for in the filtering steps.

Wheel depth is independent of speed. However, detection of continual positions or instantaneous depth of the detector or window is dependent on the speed of rotation of the wheel or coulter.

In a first phase, the following steps are performed:

The Spectrometer Collects Data on a frequency between 5 and 100 times per second.

There is a transformation of the power spectral density (Summed Average, Array Multiplication, etc)

The data is compared to a threshold to determine if it is in or out of the ground.

If the window is in the ground the data is sent for further analysis.

The Soil Data is now stored without its depth.

In a second phase of the analysis:

The system waits for more samples to determine speed, in ground time, and therefore window depth.

Every 10-30 seconds the In/Out data is analysed

The controller acts to determine the period of the signal, and the In/Out ratio.

The controller acts to filter all of these data points. If data is irregular or on uniform it is discarded.

Wheel Speed is calculated using the period of the wheel

Speed at window=radius×2Pi

Wheel Depth is a function of (Wheel Radius, In time, Out Time.)

Window depth is a function of (Wheel depth, Speed, Current Time, the first in sample of this cycle)

This data is then associated to the original data and stored/transmitted to a remote storage location.

Variations in depth measurement are used to determine a value related to surface roughness.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for measuring soil penetration comprising:
   a disk having a peripheral edge and two spaced side walls extending from the peripheral edge toward a center of the disk;
   a hub mounting the disk for rotation about an axis of the disk so that the peripheral edge rotates in the soil and the disk penetrates the soil to a depth below a surface of the soil;
   a sensor mounted in one side wall of the disk;
   the sensor being mounted on the disk for rotation therewith;
   the sensor being mounted on the disk at a position such that the sensor as the disk rotates is located above the surface of the soil during a first part of its rotation and is located below the surface during a second part of its rotation;
   the sensor being adapted to issue a signal which changes in response to whether the sensor is above or below the soil surface;
   and a controller responsive to the signal and adapted to calculate from the signal a first time when the sensor enters below the soil surface and a second time when the sensor departs the soil surface and to calculate from the first and second times the depth of penetration of the disk in the soil.

2. The apparatus according to claim 1 wherein the sensor is arranged to provide data relating to characteristics of the soil when the sensor is below the soil surface and the controller calculates a maximum depth of penetration of the disk at the sensor so as to determine by the sensor characteristics of the soil at calculated depths.

3. The apparatus according to claim 1 including an assembly for changing a downward pressure on the disk so as to change a maximum depth of penetration of the sensor.

4. The apparatus according to claim 1 including a seeding component for supplying seeds into a furrow formed by the peripheral edge of the disk.

5. The apparatus according to claim 4 including an assembly for changing a downward pressure on the disk so as to change the depth of the furrow and hence the depth of the supply of seeds.

6. The apparatus according to claim 1 wherein the controller includes filter steps arranged to average depths over a period of time so that clumps in the soil surface are averaged out or compensated.

7. The apparatus according to claim 1 wherein the controller is arranged to generate a value indicative of speed or rate of rotation and to calculate therefrom a depth of the detector as the detector rotates with the disk below the soil surface.

8. The apparatus according to claim 7 wherein the sensor feeds the depth to an analysis system to obtain an analysis of characteristics of the soil from the surface to a maximum depth as the depth of the sensor varies as the sensor rotates with the disk.

9. The apparatus according to any claim 1 wherein the sensor detects a reflected beam.

10. The apparatus according to claim 1 wherein there is provided an assembly for changing a downward pressure on the disk so as to change a depth of penetration of the disk and hence a depth of an operation on the soil.

11. The apparatus according to claim 10 wherein the operation comprises seeding arranged to deposit seeds in the furrow.

12. The apparatus according to claim 10 wherein of the operation comprises harvesting of underground crops.

13. The apparatus according to claim 10 wherein the operation comprises tillage or excavation.

14. The apparatus according to claim 1 wherein the controller is arranged to detect variations of a depth of the surface from the edge of the disk to provide a value indicative of the roughness of the surface.

\* \* \* \* \*